United States Patent [19] [11] Patent Number: 5,132,005
Derosa et al. [45] Date of Patent: Jul. 21, 1992

[54] COMPATIBILIZATION OF ASPHALTENES IN BITUMINOUS LIQUIDS USING BULK PHOSPHOAMINATION

[75] Inventors: Thomas F. Derosa, Passaic, N.J.; Rodney L. Sung, Fishkill, N.Y.; Benjamin J. Kaufman, Hopewell Junction, N.Y.; Eugene M. Jao, Fishkill, N.Y.

[73] Assignee: Texaco Inc., White Plains, N.Y.

[21] Appl. No.: 631,515

[22] Filed: Dec. 21, 1990

[51] Int. Cl.$^5$ .............................. C10C 3/02
[52] U.S. Cl. ...................... 208/44; 208/22; 208/39
[58] Field of Search .................. 208/44, 39, 22

[56] References Cited

U.S. PATENT DOCUMENTS 3,275,586 9/1966 Wurstner et al. ................ 208/44

Primary Examiner—Theodore Morris
Assistant Examiner—William C. Diemler
Attorney, Agent, or Firm—Robert A. Kulason; James J. O'Loughlin; Vincent A. Mallare

[57] ABSTRACT

A method of compatibilization asphaltenes containing bituminous liquids which process comprises:
 a) reacting an asphaltene with phosphorous trichloride to form a phosphochlorinated asphaltene containing from about 0.01 wt % to about 20 wt % phosphorous;
 b) reacting the phosphochlorinated asphaltene with an equimolar amount of aliphatic or aromatic amines and polyamines selected from the group consisting of:
  (i) a piperzine;
  (ii) an aliphatic amine;
  (iii) an alkyl piperdize;
  (iv) an aligomeric mixed polyether aliphatic terminal diamine;
  (v) an oligomeric polyether aliphatic terminal amine;
  (vi) an oligermic polyether aliphatic terminal triamine;
  (vii) a substituted aromatic polyether terminal amine; and
  (viii) an oligomeric or polymeric amine to produce a capatibilized asphaltene; and
 (c) recovering the asphaltene product.

33 Claims, No Drawings

COMPATIBILIZATION OF ASPHALTENES IN BITUMINOUS LIQUIDS USING BULK PHOSPHOAMINATION

BACKGROUND OF THE INVENTION

This invention relates to asphaltenes, and more particularly to the compatibilization of asphaltenes in natural and processed bituminous liquids utilizing pendant groups that behave as solubilizers and dispersants to the asphaltenes.

DISCLOSURE STATEMENT

The art contains many disclosures on asphaltene characterization and modifications designed to compatibilize said material with bituminous liquids.

Article of FUEL, Volumn 57, pgs. 25-28 (1978), teaches the art of asphaltenes compatibilization by the chemical incorporation of oxygen.

U.S. Pat. No. 4,182,613 discloses a method of compatibilizing asphaltic constituents in fuels by the addition of sedimant-stabilizing alkylaryl sulfonic acids containing 10 to 70 carbon side chains.

Article of Journal of the American Oil Chemists Society, Volumn 60, No. 7, pgs 1349-1359 (1983), teaches the art of coal dispersion in water through the use of polyamine surfactants.

U.S. Pat. No. 4,378,230 discloses a method compatibilizing Bunker "C" oil and water emulsions using dextrins.

British Patent 707,961 discloses methods designed to improve yields and extend the range of applicability of producing organo-phosphorous compounds.

Japanese Patent 5 9004-690-A discloses a method of stabilizing coal slurries by modification of coal using polyether phosphoric ester salts.

The disclosures in the forgoing patents and research articles which relate to asphaltene compatibilization, namely U.S. Pat. Nos. 4,182,613 and 4,378,230; British Patent 707,961; Japanese Patent 5 9004-690-A; Article of FUEL, Volumn 57, pgs 25-28 (1978); and Article of Journal of the American Oil Chemists Society, Volumn 60, No. 7, pgs 1349-1349 (1983) are incorporated herein by reference.

An object of this invention is to provide a method of stabilizing asphaltenes in Bunker "C" oil.

A further object of this invention is to provide a method of stabilizing asphaltenes in Bunker "C" oil containing Light Recycle Gas Oil.

SUMMARY OF THE INVENTION

This invention provides a method of compatibilizing asphaltenes containing bituminous liquids. The method comprises:

a) reacting an asphaltene with phosphorous trichloride to produce a phosphochlorinated-asphaltene containing from about 0.01 wt. % to about 20 wt. % phosphorous;

b) reacting the phosphochlorinated-asphaltene with equimolar amounts of aliphatic or aromatic amines and polyamines selected from the group consisting of:

i) a piperzine represented by the structural formula:

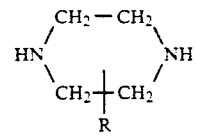

where R is hydrogen or a $(C_1-C_{10})$ branched or linear hydrocarbon selected from the group consisting of alkyl, alkenyl, alkoxyl, alaryl, aralkyl, hydroxylalkyl, and aminoalkyl;

ii) an aliphatic structural formula:

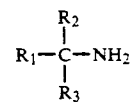

where $R_1$, $R_2$, and $R_3$ each are hydrogen or a $(C_1-C_{10})$ branched or linear hydrocarbon-selected from the group consisting of alkyl, alkenyl, alkoxyl, hydroxylalkyl, and aminoalkyl;

iii) an alkyl piperdine represented by the structural formula:

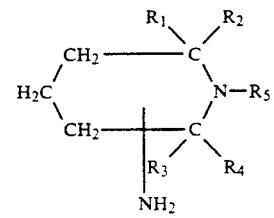

where $R_1$, $R_2$, $R_3$, $R_4$, and $R_5$ each are hydrogen or a $(C_1-C_{10})$ branched or linear hydrocarbon selected from the group consisting of alkyl, alkenyl, alkoxyl, aralkyl, alaryl, hydroxylalkyl, and aminoalkyl;

iv) an oligomeric mixed polyether aliphatic terminal diamine represented by the structural formula:

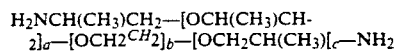

$$H_2NCH(CH_3)CH_2-[OCH(CH_3)CH_2]_a-[OCH_2CH_2]_b-[OCH_2CH(CH_3)]_c-NH_2$$

where the sum of (a+b) varies from 2 to 100 and b varies from 2 to 100;

v) an oligomeric mixed polyether aliphatic terminal amine represented by the structural formula:

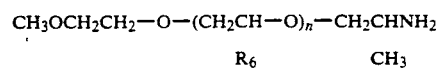

$$CH_3OCH_2CH_2-O-(CH_2CH(R_6)-O)_n-CH_2CH(CH_3)NH_2$$

where $R_6$ is hydrogen and methyl in a ratio of about 1:1 to 100:1, respectively, and n varies from 2 to 600;

vi) an oligomeric polyether aliphatic terminal triamine represented by the structural formula:

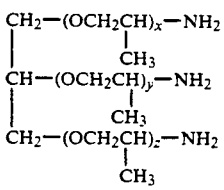

where the value of each of x, y, and z varies from about 1 to about 2000;

vii) a substituted aromatic oligomeric polyether terminal amine represented by the structural formula:

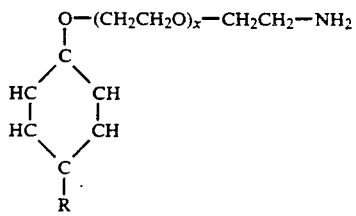

where R is hydrogen or a ($C_1$–$C_{10}$) branched or linear hydrocarbon selected from the group consisting of alkyl, alkenyl, alkoxyl, aralkyl, alaryl, hydroxylalkyl, and aminoalkyl; and viii) an oligomeric or polymeric amine represented by the structural formula:

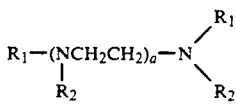

where $R_1$ and $R_2$ each are hydrogen or a ($C_1$–$C_{10}$) linear or branched hydrocarbon selected from the group consisting of alkyl, alkenyl, alkoxyl, aralkyl, alaryl, hydroxylalkyl, and aminoalkyl to produce a compatibilized asphaltene; and c) recovering said asphaltene product.

Asphaltenes that have been phosphochlorinated the- postreacted with one or more of the aforementioned amines will be characterized as being compatible with Bunker "C" oil or Bunker "C" oil blended with Light Recycle Gas Oil.

DETAILED DESCRIPTION OF THE INVENTION

Asphaltenes are components of the bitumen in petroleum, petroleum products, and other bituminous materials which are soluble in carbon disulfide but insoluble in paraffin naphtha. The physical and chemical characteristics of asphaltenes have been the subject of considerable investigation for at least a century. The asphaltene molecule appears to carry a core of approximately five stacked flat sheets of condensed aromatic rings, one above the other giving an overall height of 16-20 angstroms. The average sheet diameter appears to be about 8.5 to 15 angstroms. The molecular weight of petroleum asphaltenes ranges from about 1,000 to 10,000.

Shale oil asphaltenes appear to have a lower molecular weight.

Qualitative and semiquantitative detection of asphaltenes and bituminous liquids, e.g. petroleum and petroleum derived liquids, is conventionally carried out by observing the preciptation of asphaltenes by naphtha addition.

The presence of asphaltenes in bituminous liquid, e.g. petroleum crude, refinery streams, and other natural and processed bituminous liquids, is well known as are the problems resolving from the presence and precipitation of the asphaltenes. In petroleum production, for example, it has long been known that asphaltenes may, under some circumstances, precipitate to form a sludge which plugs up the oil bearing formation and prevents the recovery of additional petroleum. Sludge in such compositions is known to form in petroleum bearing formations, on valves, pump impellers, in conduits, and in other bituminous liquid handling equipment.

Generally, it is regarded as an advantage to keep the asphaltenes in a stable suspension in the bituminous liquid until well into the refining process. This not only increases the ultimate yield but prevents or reduces maintenance problems and also improves productivity from bituminous liquid bearing formations.

Our method for improving the compatibility of asphaltenes in Bunker "C" oil and Bunker "C" oil blends entails bulk phosphochlorination of the asphaltene followed by bulk amination of the phosphochlorinated-asphaltene intermediate. This invention constitutes a method for stabilizing asphaltenes in petroleum, shale oil, refinery streams, and other bituminous liquids. This two step process is outlined below:

Step 1. Phosphochlorination of Asphaltene

Asphaltene is initially dissolved in tetrahydrofuran (THF) and phosphochlorinated using phosphorous trichloride. Asphaltene dissolution in THF permits extensive and homogenuous asphaltene phosphochlorination.

Phosphochlorination using PCl is shown below in Equation 1 (Eq. 1).

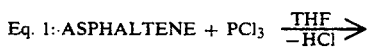

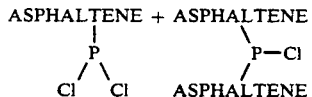

Step 2. Amination of Phosphochlorinated Asphaltene

Phosphochlorinated asphaltene readily reacts with primary and secondary amines to generate phosphoamidated asphaltenes. Post-reacting phosphochlorinated asphaltene with a polyaliphatic ether terminal diamine generating four Asphaltene phosphoamination permutations are shown below in Equation 2 (Eq.2).

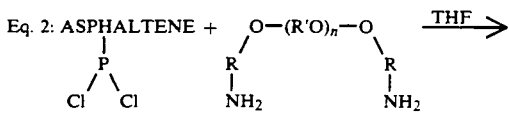

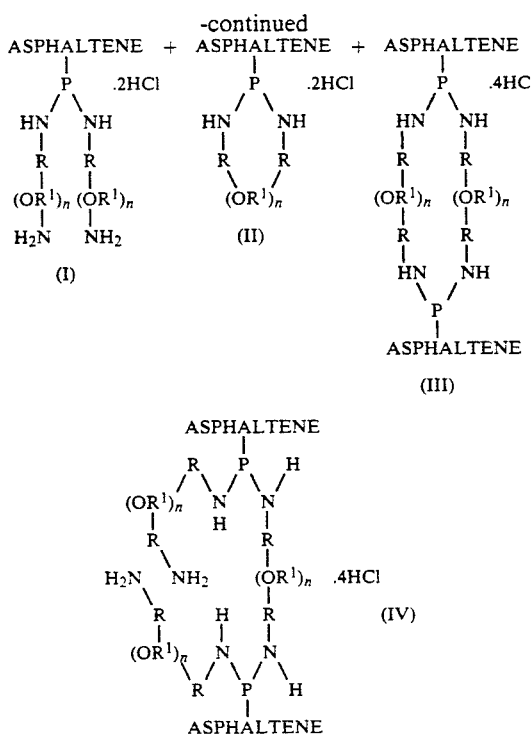

The present compatibilization process differs from other methods since the phosphochlorination and amination are homogenously distributed throughout the asphaltene. Other methods that have attempted to compatibilize asphaltenes are more aptly characterized as homogenuous surface modifications containing surface active agents.

To further emphasize the need for bulk homogenuous phosphochlorination and bulk amidation of asphaltenes to improve compatibilization of asphaltenes in bituminous liquids, blends and asphaltenes surface modifications were also prepared and evaluated for enhanced compatibility. More specifically, the rationale that was used in the following Examples is outlined below:

1) Blends of 1 wt. % and 2 wt. % of unmodified asphaltenes in Bunker "C" oil and Bunker "C" oil blends containing Light Recycle Gas Oil were assayed as baseline data. These Test Results appear below in Table I.

2) Blends of 1 wt. % to 2 wt. % phosphoamidatedasphaltenes and Bunker "C" oil and Bunker "C" oil containing Light Recycle Gas Oil were prepared and evaluated for enhanced compatibility. These tests reflect the effect of the bulk chemical modification of the asphaltene. These Test Results appear below in Tables II, III, IV, and V.

3) Blends of physical mixtures of unmodified asphaltenes and aminophosphines in bituminous liquids were evaluated for compatibility. These tests were designed to measure the effect on compatibilization that phosphoamides have upon unmodified asphaltenes. These Test Results appear below in Tables VI.

4) Bituminous liquids were phosphoamidated and then blended with with unmodified asphaltenes. These tests were designed to measure the effect on compatibilization of unmodified asphaltenes with phosphoamidated liquids. These Test Results appear below in Table VII.

5) Aminophosphine surface active agents were incorporated onto the asphaltene surface and compatibility in bituminous liquids assayed for enhanced asphaltene compatibilization. These tests were designed to measure the effect surface active agents have upon asphaltene compatibilization in bituminous oils. These Test Results appear below in Table VIII.

The following examples are provided to illustrate the advantages of the present invention as well as the general preparation and evaluation of modified asphaltenes.

In the Examples, the terms used for various materials are trade names of products manufactured and sold by Texaco Chemical Company of Houston, Tex. and defined as follows:

1) Jeffamines ED-900 and ED-3600 each bisamine terminated poly [(ethylene-co-propylene) ether] which vary as to their respective molecular weights;

2) Jeffamine M-2005 is a mono-terminated amino poly [(ethylene-co-propylene) ether] with a molecular weight of 2000.

3) Jeffamine T-5000 is a triterminated amine of glyceral containing poly (ethylene ether) and poly (propylene ether) segments so that the total molecular weight is 5000.

4) Sulfonic N - 95 is a para-nonyl phenol containing a polyethylene ether chain so that its total molecular weight is approximately 2500.

EXAMPLE I

Preparation of Phosphochlorinated-Asphaltene

Asphaltenes were obtained from Bunker "C" oil by extracting using n-heptane and thoroughly dried and ground to a 40 mesh powder.

Phosphochlorinations were performed by adding 3 wt. % neat $PCl_3$ to stirred solutions of 5 wt. % asphaltenes dissolved in THF at reflux temperature under anhydrous conditions. The mixture was permitted to react under these conditions from 1 to 75 hours. Phosphochlorinated asphaltenes were isolated by removing unreacted phosphoroustrichloride and THF through atmospheric or vacuum distillation. The presence of infrared absorbances at 1470–1420 $cm^{-1}$ and 540–520 $cm^{-1}$ for $P-CH_2$ and PCl stretches, respectively, is evidence of asphaltene phosphochlorination. This intermediate was stored under anhydrous conditions pending subsequent reaction.

EXAMPLE II

Preparation of Amino-(1,1,2,2-Tetramethyl-Piperzine)Phosphine-Modified-Asphaltene Sufficient amino-1,1,2,2-tetramethyl-piperzine was dissolved in 50 to 500 mls anhydrous THF and added to phosphochlorinated asphaltenes derived from the aforementioned example to cause complete amidation to occur. The phosphoamidated asphaltene is isolated through atmospheric or vacuum distillation.

EXAMPLE III

Preparation of Amino-(Alkyl-Piperzine)-Phosphine-Modified Asphaltene

In this example, alkyl-piperzine was substituted for the amino-1,1,2,2-tetramethyl-piperzine in Example II, to produce amino-(alkyl-piperzine)-phosphine-modified asphaltene.

EXAMPLE IV

Preparation of Amino-(Octyl)-Phosphine-Modified-Asphaltene

In this example, octadecylamine was substituted for the piperzine in Example II, to produce amino-(alkyl-phosphinemodified asphaltene.

EXAMPLE V

Preparation of Amino-(Dodecyl) Phosphine-Modified-Asphaltene

In the Example, dodecylamine was substituted for the piperzine in Example II, to produce amino-(dodecyl)-phosphinemodified asphaltene.

EXAMPLE VI

Preparation of Arteem-HT-Phosphine-Modified-Asphaltene

In this Example, Arteen-HT (hydrogenated tallow amine) was substituted for the piperzine in Example II, to produce Arteem-HT-phosphine-modified-asphaltene.

EXAMPLE VII

Preparation of Amino-(Triethylenetetraamine)-Phosphine-Modified Asphaltene

In this Example, triethylenetetraamine was substituted for the piperzine in Example II, to produce amino-(triethylenetetraamine)-phosphine-modified asphaltene.

EXAMPLE VIII

Preparation of Amino-(Jeffamine-ED-900)-Phosphine-Modified-Asphaltene

In this Example, Jeffamine ED-900 was substituted for the piperzine in Example II, to produce amino -(Jeffamine-ED-900) phosphine-modified asphaltene.

EXAMPLE IX

Preparation of Amino-(Jeffamine-ED-3600)-Phosphine-Modified-Asphaltene

In this Example, Jeffamine ED-3600 was substituted for the piperzine in Example II, to produce amino-(Jeffamine-ED-3600)-phosphine-modified-asphaltene.

EXAMPLE X

Preparation of Amino-(Jeffamine-M-2005)-Phosphine-Modified-Asphaltene

In this Example, Jeffamine M-2005 was substituted for the piperzine in Example II, to produce amino-(Jeffamine -M-2005)-phosphine-modified asphaltene.

EXAMPLE XI

Preparation of Amino-(Jeffamine-T-5000)-Phosphine-Modified-Asphaltene

In this example, Jeffamine T-5000 was substituted for the piperzine in Example II, to produce amino-(Jeffamine -T-5000) for phosphine-modified asphaltene.

EXAMPLE XII

Preparation of Amino-(Surfonic-N-95)-Phosphine-Modified-Asphalten

In this Example, aminated Surfonic N-95 was substituted for the piperzine in Example II, to produce amino-(Surfonic-N- 95)-phosphine-modified asphaltene.

EXAMPLE XIII

Preparation of Surface Active Phosphochlorinated Asphaltene

Surface phosphochlorinations of asphaltenes were performed by the addition of neat $PCl_3$ to 1 to 10 wt. % stirred slurries of asphaltene in n-heptane at reflux temperatures under anhydrous conditions. The surface phospho-chlorinated asphaltene was isolated by filtration.

EXAMPLE XIV

Preparation of Surface Active Amino-(1,1,2,2-Tetramethyl-Piperzine)-Phosphine-Asphaltene Sufficient 4-amino-1,1,2,2-tetramethyl-piperzine was added to a vigorously stirred solution to cause complete surface phosphoamidation. The material was isolated by filtration.

EXAMPLE XV

Preparation of Surface Active Amino-(Piperzine)-Phosphine-Asphaltene

In this Example, piperzine was substituted for the 4-amino-1,1,2,2 tetramethyl-piperzine in Example XIV, to produce the surface active amino-(piperzine)-phosphineasphaltene.

EXAMPLE XVI

Preparation of Surface Active Amino-(Octadecyl)-Phosphine-Asphaltene

In this Example, octadecylamine was substituted for tetramethyl-piperzine in Example XIV to produce the surface active amino -(octadecyl)-phosphine-asphaltene.

EXAMPLE XVII

Preparation of surface Active Amino-(Dodecyl)-Phosphine-Asphaltene

In this Example, dodecylamine was substituted for the tetramethyl-piperzine in Example XIV, to produce the surface active amino -(dodecyl)-phosphine-asphaltene.

EXAMPLE XVIII

Preparation of Surface Active Amino-(Armeen-HT)-Phosphine-Asphaltene

In this Example, Arteen-HT (hydrogenated tallow amine) was substituted for the tetramethyl-piperzine in Example XIV, to produce the surface active amino-(Armeen-HT)-phosphineasphaltene.

EXAMPLE XIX

Preparation of surface Active Amino-(Triethylenetetra-Amine)Phosphine-Asphaltene In this Example, triethylenetetraamine was substituted for the tetramethyl-piperzine in Example XIV, to produce the surface active amino (Triethylene tetraamine) phosphineasphaltene.

EXAMPLE XX

Preparation of Surface Active Amino-(Jeffamine-ED-900)-Phosphine-Asphaltene

In this Example, Jeffamine ED-900 was substituted for the tetramethyl-piperzine in Example XIV, to produce amino-(Jeffamine -ED-900)- phosphine-asphaltene.

EXAMPLE XXI

Preparation of surface Active Amino-(Jeffamine-ED-3600)-Phosphine-Asphaltene

In this Example, Jeffamine ED-3600 was substituted for the amino tetramethyl-piperzine in Example XIV, to produce the surface active amino -(Jeffamine -ED-3600) phosphineasphaltene.

EXAMPLE XXII

Preparation of surface Active Amino-(Jeffamine-M-2005)-Phosphine-Asphaltene

In this Example, Jeffamine M-2005 was substituted for the tetramethyl-piperzine in Example XIV to produce amino-(Jeffamine -M-2005)- phosphine-asphaltene.

EXAMPLE XXIII

Preparation of surface Active Amino-(Jeffamine-T-5000)Phosphine-Asphaltene

In this Example, Jeffamine T-5000 was substituted for the tetramethyl piperzine in Example XIV to produce the surface active amino -(Jeffamine - T-5000) phosphine-asphaltene.

EXAMPLE XXIV

Preparation of Surface Active Amino-(Surfonic-N-95)Phosphine-Asphaltene

In this Example, aminated Surfonic N-95 was substituted for the tetramethyl-piperzine in Example XIV, to produce the surface active amino -(Surfonic -N-95)- phosphine asphaltene.

EXAMPLE XXV

In this example, phosphoamidations prepared in Bunker "C" oil used the same material stoichometry outlined in Examples and 2. Here is unmodified asphaltenes were dissolved in THF and added to the Bunker "C" phosphoamidation material. Then, the THF was removed by heating this mixture gently under atmospheric pressure, and the product was recovered.

The reaction products of this invention were evaluated according to the Spot Test as cutlined in the ASTM D 2781 test method. In the spot test, Bunker "C" oil or Bunker "C" blend containing Light Recycle Gas Oil and the modified or unmodified asphaltene are heated to 150° C. for a specified time and the sample removed and agitated for a specified duration. One drop of the mixture is placed onto a sheet of filter paper using a glass rod. The filter paper is baked in the oven and oil diffuses radically from the point of addition to give a uniform brown circle. Any asphaltenes which have precipitated during this process appear as a ring of darker material. The sample is rated using integers on a scale of one through five, the higher numbers indicating that precipitation has occurred.

Below, Tables I through VIII provide a summary of these spot test results.

TABLE 1

Spot Test Results Using ASTM Test Method D 2781 For Unmodified Asphaltene Samples Used As References

| Sample | Spot Test Rating |
|---|---|
| 1 wt % Asphaltene + 99 wt % Bunker "C" oil | 3 |
| 2 wt % Asphaltene + 98 wt % Bunker "C" oil | 3 |
| 1 wt % Asphaltene + 99 wt % 4:1 wt/wt Light Recycle Gas Oil | 3 |
| 2 wt % Asphaltene + 98 wt % 4:1 wt/wt Light Recycle Gas Oil and Bunker "C" oil | 3 |

TABLE II

Spot Test Results Using ASTM Test Method D 2781 And A 1 wt.% Sample in Bunker "C" Oil

| Sample | Spot Test Rating |
|---|---|
| Phosphochlorinated Asphaltene + Piperazine | 2 |
| Phosphochlorinated Asphaltene + Amino-TEMP (4-amino-2,2,6,6-tetramethyl-piperdine) | 1 |
| Phosphochlorinated Asphaltene + Octadecylamine | 1 |
| Phosphochlorinated Asphaltene + Dodecylamine | 1 |
| Phosphochlorinated Asphaltene + Armeen-HT (hydrogenated tallow amine) | 1 |
| Phosphochlorinated Asphaltene + triethylenetetramine | 1 |
| Phosphochlorinated Asphaltene + Jeffamine ED-900 | 1 |
| Phosphochlorinated Asphaltene + Jeffamine ED-3600 | 1 |
| Phosphochlorinated Asphaltene + Jeffamine M-2005 | 1 |
| Phosphochlorinated Asphaltene + Jeffamine T-5000 | 1 |
| Phosphochlorinated Asphaltene + Aminated Surfonic N-95 | 1 |

TABLE III

Spot Test Results Using ASTM Test Method D 2781 And A 2 wt % Sample in Bunker "C" Oil

| Sample | Spot Test Rating |
|---|---|
| Phosphochlorinated Asphaltene + Piperazine | 1 |
| Phosphochlorinated Asphaltene + Amino-Temp (4-amino-2,2,6,6-tetramethyl-piperdine) | 3 |
| Phosphochlorinated Asphaltene + Octadecylamine | 1 |
| Phosphochlorinated Asphaltene + Dodecylamine | 1 |
| Phosphochlorinated Asphaltene + Armeen-HT (hydrogenated tallow)amine | 1 |
| Phosphochlorinated Asphaltene + Jeffamine ED-900 | 2 |
| Phosphochlorinated Asphaltene + Jeffamine ED-3600 | 1 |
| Phosphochlorinated Asphaltene + Jeffamine M-2005 | 1 |
| Phosphochlorinated Asphaltene + Jeffamine T-5000 | 1 |
| Phosphochlorinated Asphaltene + Aminated Surfonic N-95 | 1 |

TABLE IV

Spot Test Results Using ASTM Test Method D 2781 And A 1 wt % Sample In A 4:1 wt/wt Blend Of Light Recycle Gas Oil And Bunker "C" Oil, Respectively.

| Sample | Spot Test Rating |
|---|---|
| Phosphochlorinated Asphaltene + Piperazine | 1 |
| Phosphochlorinated Asphaltene + Amino-TEMP (4-amine-2,2,6,6,-tetramethyl-piperdine) | 1 |
| Phosphochlorinated Asphaltene + Octadecylamine | 1 |
| Phosphochlorinated Asphaltene + Dodecylamine | 1 |
| Phosphochlorinated Asphaltene + Armeen-HT | 1 |

TABLE IV-continued

Spot Test Results Using ASTM Test Method D 2781 And A 1 wt % Sample In A 4:1 wt/wt Blend Of Light Recycle Gas Oil And Bunker "C" Oil. Respectively.

| Sample | Spot Test Rating |
|---|---|
| (Hydrogenated tallow)amine | 1 |
| Phosphochlorinated Asphaltene + Triethylenetetramine | 1 |
| Phosphochlorinated Asphaltene + Jeffamine ED-900 | 1 |
| Phosphochlorinated Asphaltene + Jeffamine ED-3600 | 1 |
| Phosphochlorinated Asphaltene + Jeffamine M-2005 | 1 |
| Phosphochlorinated Asphaltene + Jeffamine T-5000 | 1 |
| Phosphochlorinated Asphaltene + Aminated Surfonic N-95 | 1 |

TABLE V

Spot Test Results Using ASTM Test Method D 2781 And A 2 wt % Sample In A 4:1 wt/wt Blend Of Light Recycle Gas Oil And Bunker "C" Oil Respectively.

| Sample | Spot Test Rating |
|---|---|
| Phosphochlorinated Asphaltene + Piperazine | 1 |
| Phosphochlorinated Asphaltene + Amino-TEMP (4-amine-2,2,6,6-tetramethyl-piperdine) | 1 |
| Phosphochlorinated Asphaltene + Octadecylamine | 1 |
| Phosphochlorinated Asphaltene + Dodecylamine | 1 |
| Phosphochlorinated Asphaltene + Armeen-HT (Hydrogenated tallow)amine | 1 |
| Phosphochlorinated Asphaltene + Triethylenetetraamine | 1 |
| Phosphochlorinated Asphaltene + Jeffamine ED-900 | 1 |
| Phosphochlorinated Asphaltene + Jeffamine ED-3600 | 1 |
| Phosphochlorinated Asphaltene + Jeffamine M-2005 | 1 |
| Phosphochlorinated Asphaltene + Jeffamine T-5000 | 1 |
| Phosphochlorinated Asphaltene + Aminated Surfonic N-95 | 1 |

TABLE VI

Spot Test Results Using ASTM Test Method D 2781 For Physical Blends Containing Unmodified Asphaltenes And 1 Or 2 wt % Triphosphoamidated Compounds in Bunker "C" oil.

| Sample | Spot Test Rating |
|---|---|
| Asphaltene + 1 wt % blend of tri(octadecylamino)phosphine | 3 |
| Asphaltene + 2 wt % blend of tri(octadecylamino)phosphine | 3 |
| Asphaltene + 1 wt % blend of tri(dodecylamino)phosphine | 3 |
| Asphaltene + 2 wt % blend of tri(dodecylamino)phosphine | 3 |
| Asphaltene + 1 wt % amino)phosphine | 3 |
| Asphaltene + 2 wt % amino)phosphine | 3 |
| Asphaltene + 1 wt % blend of tri(Jeffamine M-2005 amino)phosphine | 3 |
| Asphaltene + 2 wt % blend of tri(Jeffamine M-2005 amino)phosphine | 3 |
| Asphaltene + 1 wt % blend of tri(Aminated Surfonic N-95 amino)phosphine | 3 |
| Asphaltene + 2 wt % blend of tri(Aminated Surfonic N-95 amino)phosphine | 3 |

TABLE VII

Spot Test Results Using ASTM Test Method D 278 For Physical Blends Of Triphosphoamidated Compounds Prepared In Bunker "C" Oil And Unmodified Asphaltenes.

| Sample | Spot Test Rating |
|---|---|
| Asphaltene + Bunker C oil w/ 1 wt % tri(Jeffamine M-2005)phosphine | 3 |
| Asphaltene + Bunker C oil w/ 2 wt % tri(Jeffamine M-2005)phosphine | 3 |
| Asphaltene + Bunker C oil w/ 1 wt % tri(n-Dodecylamino)phosphine | 3 |
| Asphaltene + Bunker C oil w/ 2 wt % tri(n-Dodecylamino)phosphine | 3 |
| Asphaltene + Bunker C oil w/ 1 wt % tri(amino TEMP)phosphine | 3 |
| Asphaltene + Bunker C oil w/ 2 wt % tri(amino TEMP)phosphine | 3 |

TABLE VIII

Spot test Results Using ASTM Test Method D 2781 For Asphaltenes Containining Phosphoamidated Surface Active Agents

| Sample | Spot Test Rating |
|---|---|
| Phosphochlorinated Asphaltene Slurry + Octadecylamine | 3 |
| Phosphochlorinated Asphaltene Slurry + Aminated Surfonic N-95 | 3 |
| Phosphochlorinated Asphaltene Slurry + Jeffamine M-2005 | 3 |
| Phosphochlorinated Asphaltene Slurry + Piperazine | 3 |

As the foregoing data indicate, amidation of bulk phospho-chlorinated asphaltenes causes dramatic compatibilization in Bunker "C" oil and Bunker "C" oil blends containing Light Recycle Gas Oil. Less dramatic results are obtained by the incorporation of surface active agents onto asphaltenes. Finally, little emulifying effect was observed by blending unmodified asphaltenes with Bunker "C" oil and oil blends containing amidated trichlorophosphorous.

What is claimed:

1. A method of compatibilizing asphaltenes containing bituminous liquids comprising the steps:
   a) reacting an asphaltene with phosphorous trichloride to produce a phosphochlorinated-asphaltene containing from about 0.01 wt % to about 20 wt. % phosphorous;
   b) reacting said phosphorchlorinated-asphaltene with equimolar amounts of aliphatic or aromatic amines and polyamines selected from the group consisting of:
   i) a piperzine represented by the structural formula:

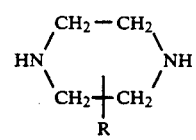

where R is hydrogen or a ($C_1$–$C_{10}$) branched or linear hydrocarbon selected from the group consisting of alkyl, alkenyl, alkoxyl, alaryl, aralkyl, hydroxylalkyl, and aminoalkyl;
   ii) an aliphatic amine represented by the structural formula:

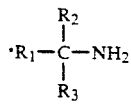

where $R_1$, $R_2$, and $R_3$ are hydrogen or a ($C_1$–$C_{10}$) branched or linear hydrocarbon selected from the group consisting of alkyl, alkenyl, alkoxyl, hydroxyyalkyl, and aminoalkyl;

iii) an alkyl piperdine represented by the structural formula:

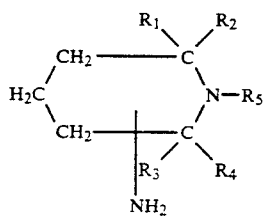

where $R_1$, $R_2$, $R_3$, $R_4$, and $R_5$ are hydrogen or a ($C_1$–$C_{10}$) branched or linear hydrocarbon selected from the group consisting of alkyl, alkenyl, alkoxyl, aralkyl, alaryl, hydroxylalkyl, and aminoalkyl;

iv) an oligomeric mixed polyether aliphatic terminal diamine represented by the structural formula:

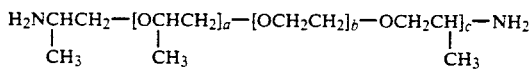

where the sum of (a+b) varies from 2 to 100 and b varies from 2 to 100;

v) an oligomeric polyether aliphatic terminal amine represented by the structural formula:

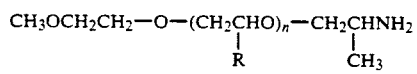

where R consists of hydrogen and methyl in a ratio of from 1:1 to from 100:1, respectively, and n varies from 2 to 600;

vi) an oligomeric polyether aliphatic terminal triamine represented by the structural formula:

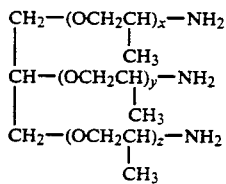

where x, y, and z each vary from 1 to 2000;

vii) a substituted aromatic oligomeric polyether terminal amine represented by the structural formula:

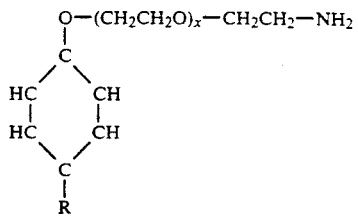

where R is hydrogen or a ($C_1$–$C_{10}$) branched or linear hydrocarbon selected from the group consisting of alkyl, alkenyl, alkoxyl, aralkyl, alaryl, hydroxyalkyl, and aminoalkyl; and viii) an oligomeric or polymeric amine represented by the structural formula:

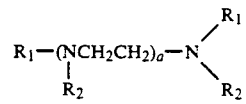

where $R_1$ and $R_2$ each are hydrogen or a ($C_1$–$C_{10}$) linear or branched hydrocarbon selected from the group consisting of alkyl, alkenyl, alkoxyl, aralkyl, alaryl, hydroxylalkyl, and aminoalkyl to produce a compatibilized asphaltene; and c) recovering said asphaltene product.

2. An asphaltene product prepared by the process of claim 1 where the phosphorous content of the asphaltene product is from 0.10 wt percent to 10 weight percent.

3. An asphaltene product prepared by the process of to claim 1 where the phosphorous content of the asphaltene product is from 1 to 5 weight percent.

4. An asphaltene product prepared by the process of claim 1 in which said aliphatic amine is piperazine.

5. An asphaltene product prepared by the process of claim 1 in which said aliphatic amine is octadecylamine.

6. An asphaltene product prepared by the process of claim 1 in which said aliphatic amine is dodecylamine.

7. An asphaltene product prepared by the process of claim 1 in which said aliphatic amine is hydrogenated tallow amine.

8. An asphaltene product prepared by the process of claim 1 in which said amino-1,1,2,2-tetramethylpiperdine is 4-amino-1,1,2,2-tetramethylpiperdine.

9. An asphaltene product prepared by the process of claim 1 in which said oligomeric mixed polyether aliphatic terminal diamine is poly diamine having a molecular weight of 900.

10. An asphaltene product prepared by the process of claim 1 in which said oligmeric mixed polyether aliphatic terminal diamine is poly diamine having a molecular weight of 3600.

11. An asphaltene product prepared by the process of claim 1 in which said oligomeric mixed polyether aliphatic terminal amine is poly amine having a molecular weight of 2005.

12. An asphaltene product prepared by the process of claim 1 in which said oligomeric mixed polyether aliphatic terminal triamine is poly triamine having a molecular weight of 5000.

13. An asphaltene product prepared by the process of claim 1 in which said aromatic oligomeric polyether terminal amine is aminated para-nonyl phenol.

14. The asphaltene product of claim 2 in which said aliphatic amine is piperazine.

15. The asphaltene product of claim 2 in which said aliphatic amine is octadecylamine.

16. The asphaltene product of claim 2 in which said aliphatic amine is dodecylamine.

17. The asphaltene product of claim 2 in which said aliphatic amine is hydrogenated tallow amine.

18. The asphaltene product of claim 2 in which said amino-1,1,2,2-tetramethylpiperdine is 4-amino-1,1,2,2-tetramethylpiperdine.

19. The asphaltene product of claim 2 in which said oligomeric mixed polyether aliphatic terminal diamine is poly diamine having a molecular weight of 900.

20. The asphaltene product of claim 2 in which said oligomeric mixed polyether aliphatic terminal diamine is poly diamine having a molecular weight of 3600.

21. The asphaltene product of claim 2 in which said oligomeric mixed polyether aliphatic terminal amine is poly amine having a molecular weight of 2005.

22. The asphaltene product of claim 2 in which said oligomeric mixed polyether aliphatic terminal triamine is poly triamine having a molecular weight of 500.

23. The asphaltene product of claim 2 in which said aromatic oligomeric polyether terminal amine is aminated para-nonyl phenol.

24. The asphaltene product of claim 3 in which said aliphatic amine is piperzine.

25. The asphaltene product of claim 3 in which said aliphatic amine is octadecylamine.

26. The asphaltene product of claim 3 in which said aliphatic amine is dodecylamine.

27. The asphaltene product of claim 3 in which said aliphatic amine is hydrogenated tallow amine.

28. The asphaltene product of claim 3 in which said amino-1,1,2,2-tetra-methylpiperzine is 4-amino-1,1,2,2-tetramethylpiperzine.

29. The asphaltene product of claim 3 in which said oligomeric mixed polyether aliphatic terminal diamine is poly diamine having a molecular weight of 900.

30. The asphaltene product of claim 3 in which said oligomeric mixed polyether aliphatic terminal diamine is poly diamine having a molecular weight of 3600.

31. The asphaltene product of claim 3 in which said oligomeric mixed polyether aliphatic terminal amine is poly amine having a molecular weight of 2005.

32. The asphaltene product of claim 3 in which said oligomeric mixed polyether aliphatic terminal triamine is poly triamine having a molecular weight of 5000.

33. The asphaltene product of claim 3 in which said aromatic oligomeric polyether terminal amine is aminated para-nonyl phenol.

* * * * *